United States Patent [19]

Margraf

[11] Patent Number: 4,878,927
[45] Date of Patent: Nov. 7, 1989

[54] FILTERING SEPARATOR FOR PARTICLES AND HARMFUL GASES FROM UNREFINED GASES

[76] Inventor: Adolf Margraf, Am Schleplingsbach 46, D-3060 Stadthagen, Fed. Rep. of Germany

[21] Appl. No.: 111,781

[22] Filed: Oct. 21, 1987

[30] Foreign Application Priority Data

Oct. 22, 1986 [DE] Fed. Rep. of Germany ....... 3635921
Nov. 21, 1986 [DE] Fed. Rep. of Germany ....... 3639824

[51] Int. Cl.$^4$ .............................................. B01D 46/00
[52] U.S. Cl. ...................................... 55/302; 55/304; 55/341.1; 55/432; 55/338
[58] Field of Search ...................... 55/96, 97, 302, 304, 55/432, 338, 341 R, 341 NT

[56] References Cited

U.S. PATENT DOCUMENTS

| | | | |
|---|---|---|---|
| 3,376,696 | 4/1968 | Wells et al. | 55/302 |
| 3,887,343 | 6/1975 | Margraf | 55/432 |
| 3,892,543 | 7/1975 | Margraf | 55/97 |
| 4,203,737 | 5/1980 | Margraf | 55/432 |

FOREIGN PATENT DOCUMENTS

| | | |
|---|---|---|
| 168344 | 9/1904 | Fed. Rep. of Germany . |
| 2214983 | 10/1973 | Fed. Rep. of Germany . |
| 2542300 | 5/1977 | Fed. Rep. of Germany . |
| 2215025 | 12/1980 | Fed. Rep. of Germany . |

Primary Examiner—Bernard Nozick
Attorney, Agent, or Firm—Balogh, Osann, Kramer, Dvorak, Genova & Traub

[57] ABSTRACT

In the case of a filtering separator, the housing of which is divided by a perforated partition into a filter space and a pure gas space the filter space being supplied with unrefined gas, receiving filter elements which are to be cleansed by counterflow flushing and/or agitation, and having a bottom dust collector trough incorporating a dust extraction conveyor, the dust obtained being partly fed to the filter elements again with unrefined gas, the dust collector trough is provided in the area of its dust extraction conveyor with at least one opening leading to an unrefined gas guiding space which is situated at a lower level and connected to the filter space at the top or side, the lower section of which has disposed in it a loosener for the downwardly dropping dust, via which the incoming unrefined gas flows into the unrefined gas guiding space.

10 Claims, 3 Drawing Sheets

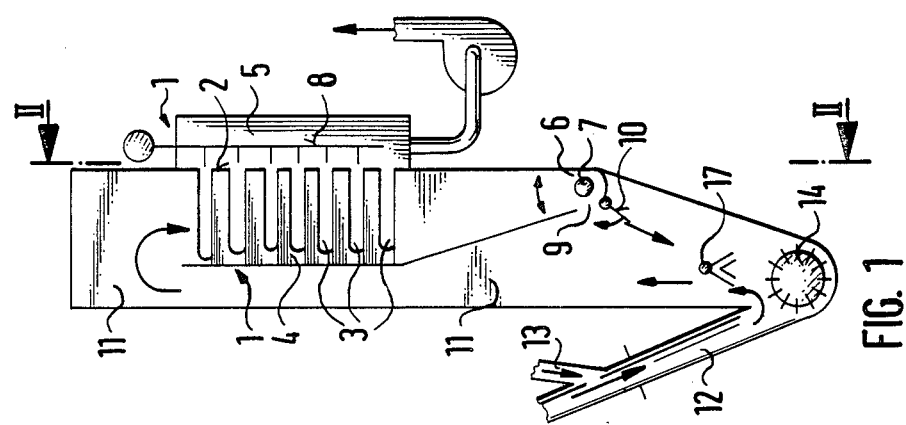
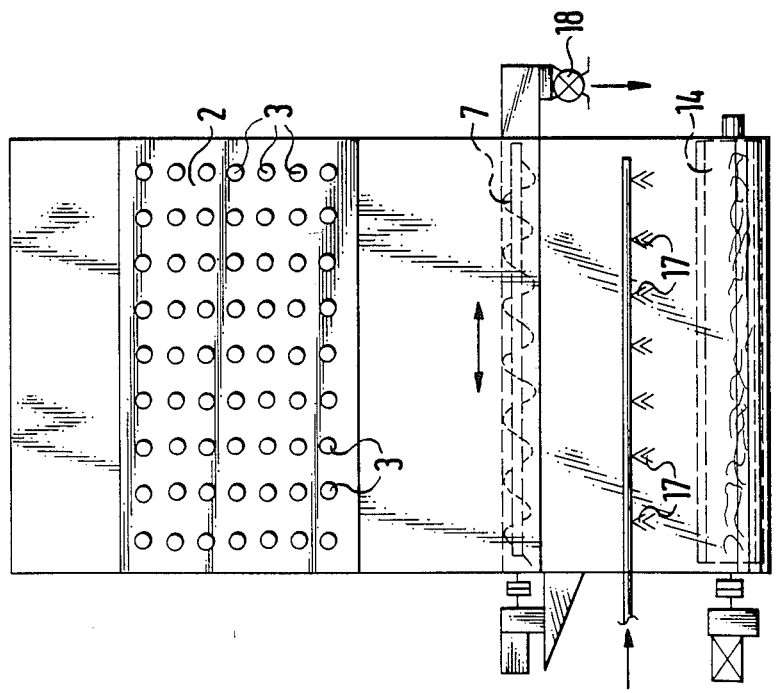

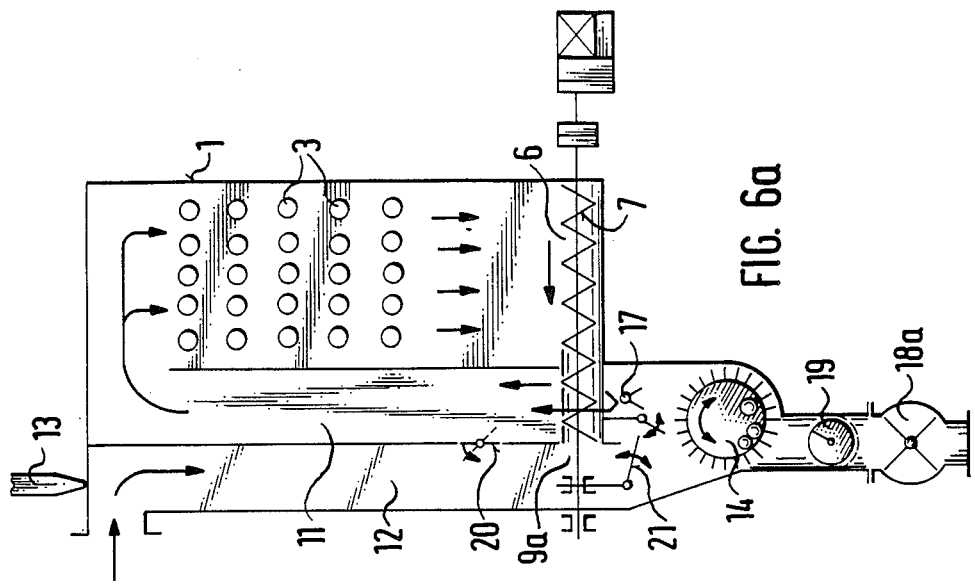
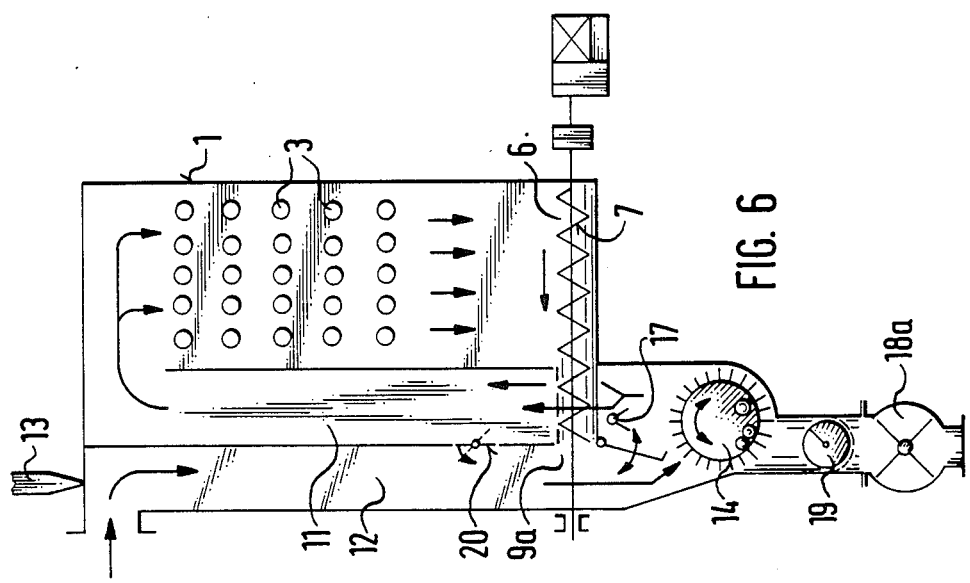

FILTERING SEPARATOR FOR PARTICLES AND HARMFUL GASES FROM UNREFINED GASES

BACKGROUND OF THE INVENTION

This invention relates to a filtering separator for particles and combined harmful gases from unrefined gases, the housing of which is divided by a perforated partition into a filter space supplied with unrefined gas, receiving filter elements which are to be cleansed by counterflow flushing and/or agitation and having a bottom collector trough incorporating a dust extraction conveyor, and a purified gas space, the dust obtained or the harmful gases combined with additives being partially conveyed to the filter elements again with the unrefined gas, and a dust quantity corresponding to the dust quantity newly added from the unrefined gas being extracted at a point appropriate for this purpose.

As far as possible, only the term dust will be utilised in the following and in the claims, to simplify the description, instead of particles and separation or combination of harmful gas.

DESCRIPTION OF THE PRIOR ART

Filtering separators for filtering dust out of an unrefined gas, e.g. according to the German Patent Specifications Nos. 27 38 118, 27 43 805 and 34 10 483, which operate with a system for dust return to the filter elements, have the advantage of being able to achieve comparatively low investment and/or operating costs in the case of the separation of minute adhesive particles and/or that of anhydrous chemical absorption of harmful gases by means of supplemental additives. In the case of such separators comprising a dust return system and an integral spherical rotor (sieve drum partly filled with heavy objects), it is possible to keep comparatively large quantities of "old" dust in motion within the separator housing without clogging, and to feed the same to the filter elements again as an admixture to the incoming unrefined gas.

Problems may arise in the case of the aforesaid separators if a comparatively large filter surface has to be situated above a dust collector casing (large housing depth or housing height) on the pretext of spatial grounds, or if the separator is intended to be operated with large quantities of fed-back old dust and/or additive particles.

It is then difficult in these circumstances to gate out a partial amount of the old dust quantities, which are present in the separator and are comparatively large compared to the projected surface area of the dust collector casing and which corresponds to the particle quantity which is contained in the unrefined gas per unit of time, continuously from the separator.

In particular, difficulties may also arise upon taking the separator out of service, because, shortly after stopping the unrefined gas inflow, the layer of old dust, settled on the filter material and held thereon by the throughflow pressure difference prevailing thereat, drops almost completely downwards into the dust collector trough within a very brief period of time and may lead to clogging in the same.

SUMMARY OF THE INVENTION

An object of the invention consequently consists in that in the case of the aforesaid forms of construction and process conditions, stable and balanced old dust quantities and deactivation necessary from time to time, should be controllable more satisfactorily than until now.

According to the invention, this problem is resolved in the case of the filtering separator referred to in the foregoing, by the fact that the dust collector trough is provided in the area of its dust extraction conveyor with at least one opening leading to an unrefined gas guiding space situated at a lower level and connected to the filter space at the top or side and having disposed in its lower portion a loosener for the downwardly dropping dust particles, via which the incoming unrefined gas flows into the unrefined gas guiding space and to the filter elements.

The procedure followed in this solution is that the old dust balance in the separator is controlled by the fact that the old dust obtained during the cleansing of the filter elements is conveyed by the conveyor in the dust collector trough of the dust collector body to fall downwards via one or more trough openings into the unrefined gas guiding space and to the loosener, e.g. in the form of a spherical rotor, and is then fed to the filter elements again by means of the unrefined gas. This is continued until a parameter of the separator, e.g. its flow resistance, reaches a predetermined value whereupon the surplus dust is withdrawn in outward direction by the dust conveyor in the collector trough.

The outward conveying of dust from the trough occurs in each-case when the quantity of old dust in the separator becomes undesirably large.

In this connection, it is possible according to one embodiment to allow the unrefined gas guiding space to extend laterally parallel to and along the length of the dust collector body, the collector trough being provided in the area of the conveyor screw and advantageously along its length with partly or wholly closable openings leading to the unrefined gas guiding space, in which the conveyor screw is reversible, so that the dust freed from the filter elements by counterflow flushing and/or agitation is conveyed into the unrefined gas guiding space via the lateral openings in the one direction of rotation, or to the outside with the other direction of rotation.

In accordance with a second possiblity, the unrefined gas guiding space is arranged at the front of the filter housing and transversely to the extension of the dust extraction conveyor in the dust collector trough, the dust obtained being conveyed to the outside or into the unrefined gas guiding space in the aforesaid manner. In the case of either possibility, it is also possible however to proceed in such manner that the dust extraction conveyor may rotate in one direction only and that its open end then leads into the unrefined gas guiding space which is provided below the dust loosener with a discharge screw which may be turned on and off and the extremity of which has connected to it a discharge gate for extraction of the surplus dust.

If it is intended to purify unrefined gases containing harmful gases, additives for fixing these harmful gases are added to the unrefined gas infeed. If these unrefined gases have adequately high temperatures, it may be advantageous according to the invention to add water or water vapour in a controllable manner as a function of the temperature in the region of the loosener, so that the fixing of harmful gases is accelerated thereby.

In any case, the old dust obtained is fed by the conveyor in the trough to the loosener in the immediately following unrefined gas guiding space and is then conveyed to the filter elements again by the unrefined gas, or the old dust is extracted to the outside after an undesirable increase in the quantity in the separator, e.g. until the filter resistance has dropped sufficiently whereupon the old dust is fed back to the filter elements again via the unrefined gas guiding space. An approximate state of balance is maintained thereby in practice. The embodiment according to the invention has the advantage however, apart from the possibility of keeping large quantities of old dust in the separator, that the possible occurrence of clogging actions upon deactivating the separator is prevented. As a matter of fact, the very large dust quantities adhering to the surfaces of the filter elements drop down suddenly upon deactivation since they are no longer retained on the filter surfaces by the pressure differential, but may then be carried outwards by the extraction conveyor in the collector trough.

BRIEF DESCRIPTION OF THE DRAWINGS

The invention and other advantageous features are described in the following with reference to the drawings. In these:

FIG. 1 shows a schematic vertical cross-section through an embodiment of the filtering separator according to the invention, FIG. 2 shows a front view with a section taken through the refined gas space along the line II—II of FIG. 1.

DETAILED DESCRIPTION OF PREFERRED EMBODIMENTS

Figure 3:
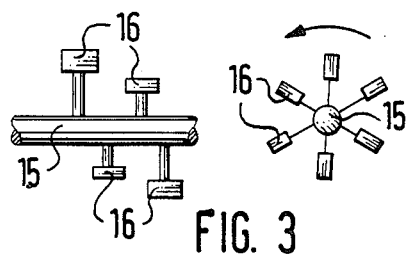
FIG. 3 shows a partial length, and also an end view, of a loosener.
Figure 4:
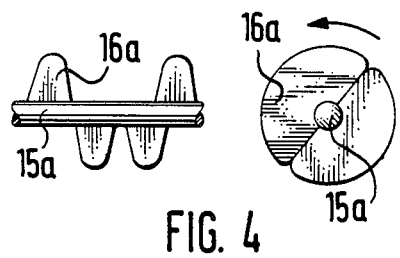
FIG. 4 shows a partial length, and an end view, of another loosener.

According to FIGS. 1 and 2, the housing 1 of a filtering separator is divided by a perforated partition 2 into a dedusting space 4 receiving the filter elements 3, e.g. being filter bags, and a purified gas space 5. The housing 1 is provided with a bottom dust collector space, the bottom dust collector trough 6 of which has disposed in it a dust extraction conveyor 7, which is advantageously a conveyor screw 7, one direction of rotation of which causes the surplus dust obtained during the cleansing action to be conveyed to the outside via an external discharge gate 18. The cleansing of the filter elements 3 is performed by counterflow flushing, e.g. by means of compressed gas nozzles 8 and/or by means of an agitation.

In the case of the embodiment of the filtering separator according to FIGS. 1 and 2, the dust collector trough 6 is provided laterally and along its length with openings 9 which if necessary may be closed wholly or partly by means of sliders or flaps 10. The openings lead into an unrefined gas guiding space 11 which is connected to the dedusting space 4 above the filter elements 3 or laterally thereto. The unrefined gas duct 12, to which additives for fixing possible harmful gases may be added via a connector 13, opens into the part of the unrefined gas guiding space 11 lying below the dust collector trough 6, along say the length of the trough 6. The unrefined gas fed in obliquely downwards flows through a dust loosener 14 situated in the lower unrefined gas guiding space 11, e.g. being a spherical rotor, according to FIGS. 1 and 5, which comprises a sieve drum filled partially with heavy objects, which drum is provided with scraper plates at the periphery. Instead of the spherical rotor 14, it is possible to provide a rotatable shaft 15 bearing paddles 16 which may have different angles of incidence, or a shaft 15a bearing interrupted contradirectional worm thread lengths 16a.

The known filtering separator 1 is so operated that the filter elements 3 in the dedusting space 4 are supplied with unrefined gas from the outside towards the inside. Dust particles and/or additive particles in combination with harmful gases are held back by the filter elements 3, and these particles and/or compositions are cleansed from the filter elements by counterflow and/or agitation after the resistance of the filter elements rises above a specified level, the old dust separated dropping downwards into the collector trough 6. During the rotation of the conveyor 7 in one direction of rotation, this dust will drop down through the opening 9 of the trough 6 into the unrefined gas guiding space 11, in which it is loosened, spread, and also comminuted by the loosener 14, whilst being carried with the unrefined gas fed into the dedusting space 4 via the space 11 and thereupon settles on the surfaces of the filter elements 3 as old dust. The filter elements 3 are cleansed, for example one after another periodically, and the old dust cleared therefrom drops down into the collector trough 6 from which it is conveyed farther downwards to the loosener 14 and is again carried with the unrefined gas to the filter elements 3 and settles on the filter surfaces. This operation, which is known per se, is performed repeatedly until the filter resistance or the torque of the loosener 14 or the current demand of its driving motor reaches a specified maximum value, at which the openings 9 of the trough 6 may if appropriate be closed and the carrying direction of the conveyor 7 may be reversed to a discharge gate 18, so that the dust obtained is conveyed outwards in the dust collector trough 6, e.g. until the flow resistance has again reached a specified minimum value, whereupon the falling particles obtained by clearing the filter elements are again delivered into the unrefined gas guiding space 11 by the conveyor 7 by reversal of the carrying direction of the conveyor 7 and if applicable by opening the openings 9 of the trough, these operations being performed repeatedly.

By the embodiment according to the invention, extension of the period of dwell of additives which are to be introduced into the separator for fixing harmful gases, is also achieved. If the unrefined gases, which are to be purified, have sufficiently high temperatures, it may be advantageous for water or water vapour to be admixed in controllable manner by means of appropriate distributors 17 to the unrefined gas as a function of the temperature, advantageously in the area of the loosener. The fixing of harmful gases by the additives is speeded up by this addition.

Figure 5:
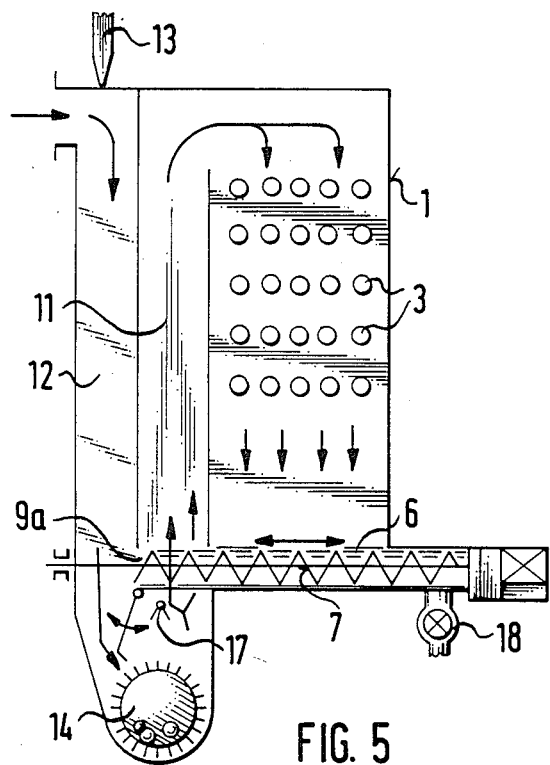
FIG. 5 shows a schematic vertical longitudinal section through a separator according to the invention which is modified as compared to FIGS. 1 and 2, FIGS. 6 and 6a show two schematic vertical longitudinal sections of two embodiments modified compared to FIG. 5.

Instead of the embodiment according to FIGS. 1 and 2, it is particularly advantageous to construct the separator 1 according to FIG. 5 in such manner that the unrefined gas guiding space 11 is situated at the front of the separator housing 1. This renders it possible to provide the extraction conveyor 7 with an extension 7a at an open extremity 9a and with a discharge gate 18 connected at the other extremity, corresponding to the embodiment according to FIGS. 1 and 2, and to reverse the conveying direction. In the one conveying direction, the open extremity 9a of the conveyor screw 7 leads into the lower part of the unrefined gas guiding space 11 in the same way as according to FIGS. 1 and 2, in which the loosener 14 having the form of the embodiment described with reference to FIGS. 1 and 2 is again disposed, to which the unrefined gas is supplied via the unrefined gas duct 12 with a possible introduction of additives. The loosener again acts to loosen, spread and comminute the dust carried from the separator by the conveyor 7 after possible cleansing of the filter surfaces of the filter elements, so that it may be ducted back to the filter elements together with the unrefined gas.

To avoid reversibility of the conveyor 7, the separator as per FIG. 5 may be modified as shown by FIGS. 6 and 6a. The open extremity 9a of the conveyor 7, rotationally drivable in one direction of rotation only, again leads into the unrefined gas guiding space 11, the lower end of which has the loosener 14 disposed in it. Below the loosener 14 is disposed a dust collector trough of approximately the same length and having a conveyor screw 19, the delivery extremity of which has a discharge gate 18a connected to it. The direction of rotation of the loosener 14 may be reversible so that, during operation, the onward displacement of the dust to the screw 19 may be promoted in one direction of rotation and prevented or attenuated in the other direction of rotation.

In the cases according to FIGS. 6 and 6a, the wall between the unrefined gas guiding space 11 and the unrefined gas feed 12 is provided with a by-pass valve 20, the setting of which permits control of the quantity of dust returned to the filter elements 3, since, the quantity of unrefined gas flowing into the area of the loosener, and its speed, may be controlled by opening the valve 20, so that greater or lesser quantities of dust are carried back to the filter elements depending on the position of the valve 20.

In the embodiment according to FIG. 6a which corresponds to that of FIG. 6, the open extremity 9a of the conveyor screw 17 is provided with a reverse flow check 21 to ensure that lighter dusts encountered may also be controlled.

What is claimed is:

1. A filtering separator comprising a housing, a perforated partition wall in said housing which subdivides the housing into a filtering space fed with an unrefined gas, and a clean gas space, means defining an unrefined gas guiding space disposed adjacent said filtering space, filtering elements on said partition wall, means for cleaning said filtering elements, a dust collecting trough, a dust conveyor associated with said trough, wherein said dust collecting trough traverses said unrefined gas guiding space and is provided at one end with an opening to a lower part of said unrefined gas guiding space, said trough being open to said filtering space, whereby the dust settled on the surface of said filtering elements during cleaning the gas being partially removed and returned to said filtering elements by a flow of unrefined gas, and means arranged in said lower part of said unrefined gas guiding space for mechanically loosening and crushing the dust which is removed by said filtering elements from the unrefined gas in order to make the dust capable of being carried with the unrefined gas back to said filtering elements in said filtering space.

2. Separator in accordance with claim 1, wherein said unrefined gas guiding space is situated at a front side of said housing transversely to the longitudinal axis of said dust conveyer, wherein one end of said trough is open to said unrefined gas guiding space and the other end is open to a dust discharging sluice.

3. Separator in accordance with claim 1, wherein displaceable sheet metal plates adjust said trough opening to said unrefined gas guiding space.

4. Separator in accordance with claim 1, wherein said unrefined gas guiding space is situated along a front side of said housing transversely to the longitudinal axis of said conveyer, and a second dust discharging conveyer with dust discharging sluice being disposed below said loosening means.

5. Separator in accordance with claim 1, wherein said loosening means comprises a sieve drum with scratching sheet metal plates on its periphery and being filled partially with heavy objects.

6. Separator in accordance with claim 1, comprising a bypass flap which is adjustable by controlling a flow of the separator disposed in said partition wall between an unrefined gas inlet and said unrefined gas guiding space above said opening to said lower situated part.

7. Separator in accordance with claim 1, comprising a nonreturn flap disposed in the region of an opening at one end of said trough of said dust conveyor.

8. Separator in accordance with claim 1, wherein said means for cleaning comprise a means for counterflow air flushing.

9. Separator in accordance with claim 1, wherein said unrefined gas guiding space extends parallel to a side of said separator, said conveyer comprising a reversible screw disposed in said collecting trough, adjustable openings on said trough connecting to said unrefined gas guiding space.

10. Separator in accordance with claim 9, wherein said openings of said dust collecting trough are closed when one direction of rotation of said screw conveyer is used whereby the dust is transported by means of said screw conveyer to a dust discharging sluice, whereas said openings of said collecting trough are open completely or partially to said unrefined gas guiding space when the other direction of rotation of said screw conveyor is used.

* * * * *